(12) United States Patent
Luo

(10) Patent No.: US 6,963,804 B2
(45) Date of Patent: Nov. 8, 2005

(54) SEISMIC DATA PROCESSING METHOD TO ENHANCE FAULT AND CHANNEL DISPLAY

(75) Inventor: Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 202 days.

(21) Appl. No.: 10/299,233

(22) Filed: Nov. 19, 2002

(65) Prior Publication Data

US 2004/0098199 A1 May 20, 2004

(51) Int. Cl.$^7$ ................................................. G01V 1/28
(52) U.S. Cl. ........................................................ 702/17
(58) Field of Search .............................. 702/14, 16, 17; 367/73

(56) References Cited

U.S. PATENT DOCUMENTS

| | | | | | |
|---|---|---|---|---|---|
| 4,535,417 A | * | 8/1985 | Peacock | ...................... | 708/300 |
| 5,850,622 A | * | 12/1998 | Vassiliou et al. | ............. | 702/17 |
| 5,995,907 A | * | 11/1999 | Van Bemmel et al. | ........ | 702/16 |
| 6,131,071 A | * | 10/2000 | Partyka et al. | ................. | 702/16 |
| 6,487,502 B1 | * | 11/2002 | Taner | ........................... | 702/14 |
| 6,597,994 B2 | * | 7/2003 | Meek | ........................... | 702/16 |

* cited by examiner

*Primary Examiner*—Donald McElheny, Jr.
(74) *Attorney, Agent, or Firm*—Abelman, Frayne & Schwab

(57) ABSTRACT

A method of processing data of seismic traces for geophysical interpretation of the earth's subsurface includes the steps of determining a modified Hilbert transform of an input trace of data values to detect rapid and slow changes in the input trace with reduced sensitivity to noise and providing results of modified Hilbert transform to enable identification of any detected rapid or slow changes. The modified Hilbert transform is advantageously a windowed Fourier transform, wherein the input trace is represented as $x(t)$, where $t$ indicates time, a window function is represented by $win(\tau)$, a first function is defined as $g(\tau)=x(t-\tau)\cdot win(\tau)$, $X(t,\omega)$ is the Fourier transform of $g(\tau)$, $hi(t)$ represents a sum over imaginary portions of $X(t,\omega)$, $hr(t)$ represents a sum over real portions of $X(t,\omega)$, and the modified Hilbert transform is $h(t)=hr(t)+i\cdot hi(t)$. In its most general form, for any integer $n$ greater than 1, $hr(t)=\Sigma\omega Real\{X(t,\omega)\}^n$ and $hi(t)=\Sigma\omega Imag\{X(t,\omega)\}^n$.

26 Claims, 7 Drawing Sheets

Amplitude time slice

GHT-produced time Slice

Eigen-value Method

GHT Method

SEISMIC DATA PROCESSING METHOD TO ENHANCE FAULT AND CHANNEL DISPLAY

BACKGROUND OF THE INVENTION

1. Field of the Invention

The present invention relates generally to processing and display of seismic data, and more particularly to processing and display of seismic data using a modified Hilbert transform.

2. Description of Related Art

To find the most likely locations of hydrocarbon deposits beneath the earth's surface, geophysicists use techniques that evaluate and interpret the structure of subsurface formations. The effects of stratigraphy, lithology and pore fluid content on geophysical data, properly interpreted, can be evaluated to predict the likelihood that hydrocarbon deposits are present in the volume under analysis.

Traditionally, subsurface formations are analyzed using seismic reflection data that is processed to image acoustic boundaries in the subsurface. Seismic wave energy projected into the earth reflects in particular ways from subsurface changes in the rock properties or from combinations of such changes. The reflected seismic wave energy can be recorded at a number of shotpoints, resulting in similar artifacts on a number of adjacent seismic traces. These are interpreted as a continuous event in the reflected seismic data.

Various methods have been disclosed for detecting and displaying abrupt changes in subsurface formations within a given three-dimensional subsurface volume based on such seismic data. The goal of processing the data is to provide a detailed visual display that accurately represents the faults, channels and other geophysical features in the subsurface volume under consideration. Typically, the properties of the subsurface volume are visualized using a powerful computer such as a high end graphics workstation that can generate three-dimensional displays and/or printouts of the geophysical properties of the volume based on the collected seismic data.

A number of techniques have been disclosed that employ, in various ways, data relating to adjacent seismic traces for detecting abrupt geological changes in a given three-dimensional subsurface volume, where each seismic trace corresponds to a particular location on a subterranean surface and is produced by detection of seismic waves by receivers having that location as their common depth point. For example, U.S. Pat. Nos. 5,563,949 and 5,838,654 describe methods that are based upon the coherence of adjacent seismic traces. U.S. Pat. No. 5,724,309 discloses a method that is based on the calculation of spatial derivatives of adjacent seismic instantaneous phases. U.S. Pat. No. 5,831,935 discloses yet another type of method of processing seismic data based upon subtraction of adjacent seismic traces. And U.S. Pat. No. 5,892,732 discloses a method that includes the computation of eigenvalues derived from adjacent seismic traces.

Another type of conventional method uses a Hilbert transform to process the seismic data. For example, U.S. Pat. No. 4,945,519 discloses a method in which individual traces are processed by exponentiation to a power greater than one, the Hilbert transform of the processed traces is determined, and then ratios of the transformed traces are compared. Another example is found in U.S. Pat. No. 4,633,399, wherein the seismic trace data is rectified, Hilbert transformed and then determined as an arctangent function that constitutes a new phase parameter. However, methods applying Hilbert transforms to other than three-dimensional subsurface volumes are not particularly relevant to generating from seismic data an image representing the volume in three dimensions.

Some of the above methods, and others known in the art, have provided improved displays in their own contexts. However, in many instances these methods result in depictions of structural features such as faults, and stratigraphic features such as facies changes from reservoir quality rock to non-reservoir quality rock, that either lack clarity or simply do not appear in the depiction. As a result, even a highly trained interpreter may be unable to identify or predict the likely petrophysical characteristics of the three-dimensional subsurface volume under examination.

More specifically, the inadequacy of conventional methods for processing and displaying seismic data shows up particularly in the difficulty they encounter in clearly highlighting possible faults and channels associated with gradual, as compared with rapid or abrupt, changes in the reflected seismic wave fields. This limitation is due, at least in part, to the fact that currently available detection methods were designed to detect only abrupt local changes in the seismic wave fields, and do not address the detection of gradual changes.

SUMMARY OF THE INVENTION

It is an object of the present invention to provide a method for processing and displaying seismic data from a three-dimensional subsurface volume that avoids the problems of the prior art.

It is a further object of the present invention to provide a method for enhancing the visual display of seismic data.

It is still a further object of the present invention to provide an improved method for processing seismic data that will produce enhanced fault and channel depiction in a three-dimensional display.

It is another object of the present invention to provide a method for processing and displaying seismic data for a three-dimensional subsurface volume that highlights possible faults and channels where these features are associated with gradual changes as reflected in the seismic wavefields.

It is still another object of the present invention to provide an improved process for graphically analyzing seismic data that produces higher resolution with lower sensitivity to noise, particularly in the analysis of data recovered from regions of gradual changes in the subsurface geological features.

It is another object of the present invention to provide a method for processing and displaying seismic data for a subsurface volume so that enhanced information and displays relating to, for example, structural features such as faults and stratigraphic features such as facies changes from reservoir quality rock to non-reservoir quality rock are clearly displayable on a computer graphics workstation.

It is yet another object of the present invention to provide a method of processing and displaying seismic data that allows a better understanding of the complexity of the reservoir through an improved visualization of attributes from the three-dimensional seismic volume.

In accordance with these and other objects, the present invention provides for enhanced processing and displaying of seismic data from a three-dimensional subsurface volume by employing a Generalized Hilbert Transform (GHT), of which the traditional Hilbert transform is a special case. The GHT used in the present invention is readily applied through a collection of three-dimensional seismic data to produce enhanced displays.

Thus, in accordance with the present invention, a method of processing data of seismic traces for geophysical interpretation of the earth's subsurface includes the steps of determining a modified Hilbert transform of an input trace of data values to detect abrupt and gradual changes in the input trace with reduced sensitivity to noise and providing results of the modified Hilbert transform to enable identification of any detected abrupt or gradual changes.

The modified Hilbert transform in a preferred embodiment of the present invention is a windowed Fourier transform, wherein the input trace is represented as x(t), where t indicates time, a window function is represented by win($\tau$), a first function is defined as $g(\tau)=x(t-\tau)\cdot win(\tau)$, $X(t,\omega)$ is the Fourier transform of $g(\tau)$, hi(t) represents a sum over imaginary portions of $X(t,\omega)$, hr(t) represents a sum over real portions of $X(t,\omega)$, and the modified Hilbert transform is $h(t)=hr(t)+i\cdot hi(t)$. In its most general form, for any integer n greater than 1, $$hr(t)=\Sigma\omega Real\{X(t,\omega)\}^n \text{ and } hi(t)=\Sigma\omega Imag\{X(t,\omega)\}^n.$$

These and other objects, features and aspects of the present invention will become apparent from the following detailed description of the preferred embodiments, taken together with the following drawings.

DETAILED DESCRIPTION OF PREFERRED EMBODIMENTS

Figures 1A, 1B, 1C:
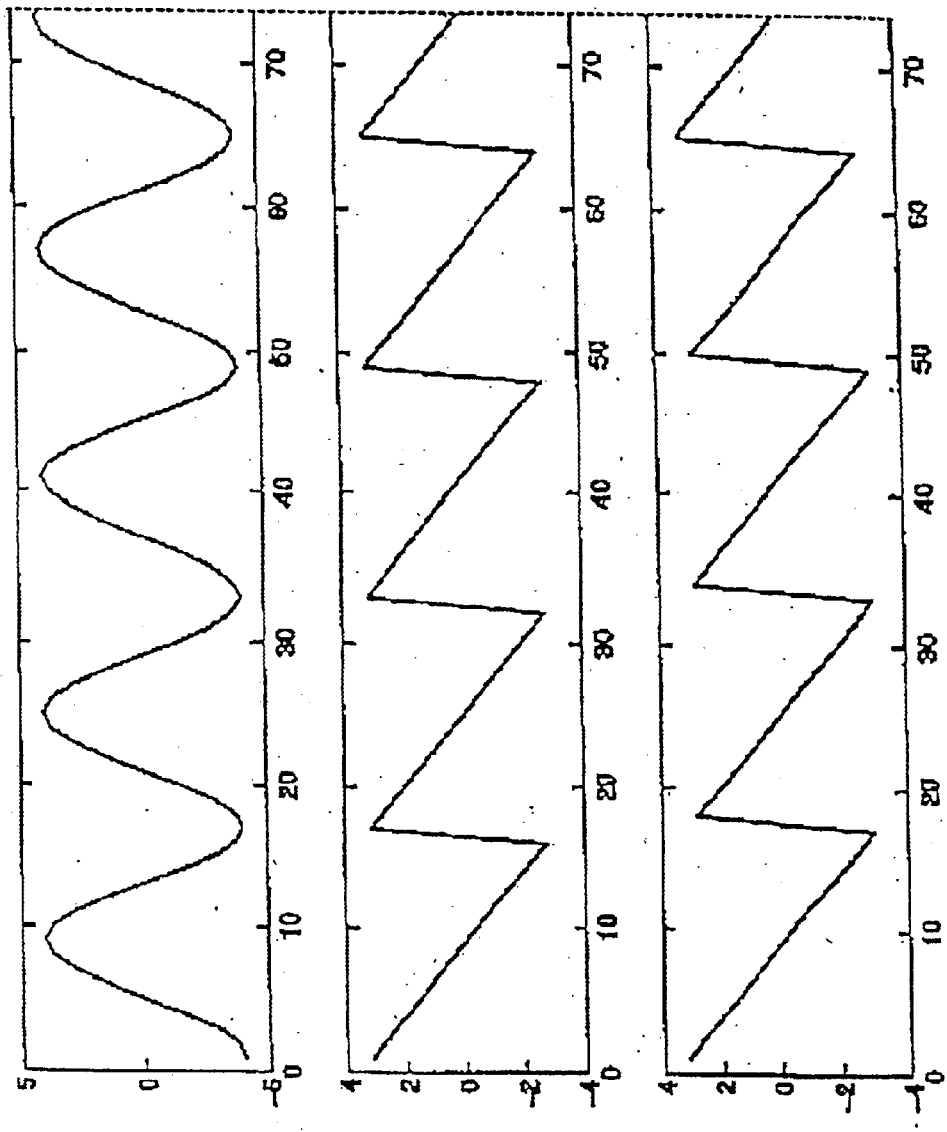
FIG. 1A is a graph of illustrative input data to represent noise-free seismic data for processing.
FIG. 1B is a graph of a conventional Hilbert transform of the data of FIG. 1A.
FIG. 1C is a graph of a Generalized Hilbert Transform in accordance with a first embodiment of the present invention of the data of FIG. 1A.

As indicated above, the present invention involves the use of a Generalized Hilbert Transform, of which the traditional Hilbert transform is a special case. Before describing the preferred embodiments of the present invention, therefore, a description of the traditional Hilbert transform will be given.

The traditional Hilbert transform (HT) in the frequency domain can be expressed as:

$$hi(\omega)=X(\omega)\cdot Sign(\omega)\cdot i \tag{1}$$

Here, $X(\omega)$ is the Fourier transform of an input trace, Sign($\omega$) is the sign function and hi($\omega$) is the Hilbert transform of x(t) in the frequency domain.

Applying, the inverse Fourier transform to hi($\omega$) in equation (1) yields:

$$hi(t)=\Sigma\omega\{X(\omega)\cdot Sign(\omega)\cdot i\cdot \exp(i\omega t)\} \tag{2}$$

For t=0, Equation (2) yields:

$$hr(0)=2*\Sigma\omega Real[X(\omega)]+Real[X(0)] \tag{3}$$

$$hi(0)=2*\Sigma\omega[Image\ X(\omega)] \tag{4}$$

$$h(0)=hr(0)+i*hi(0) \tag{5}$$

where $\Sigma\omega$ means summation over positive frequencies, and hr and hi are the real and imaginary parts of the complex trace h.

Equations 3–5 states that hi(t) can be expressed for any t by using the windowed Fourier transform. By doing so, a function is introduced as $$X(t,\tau)=g(\tau)=x(t-\tau)\cdot win(\tau) \tag{6}$$

The win($\tau$) could be a box or a Gaussian function centered at $\tau$=0. It is the well known Gabor transform when the Gaussian function is taken as win($\tau$).

Noting that X(t,$\tau$)=x(t) when $\tau$=0, applying equations 3–5 to the function g($\tau$) yields:

$$hr(t)=2*\Sigma\omega\{Real[X(t,\omega)]\}+Real[X(t,0)] \tag{7}$$

$$hi(t)=2*\Sigma\omega\{[ImagX(t,\omega)]\} \tag{8}$$

$$h(t)=hr(t)+i*hi(t) \tag{9}$$

Here $X(t,\omega)=g(\omega)$ is the windowed Fourier transform of g($\tau$).

Equations (3)–(5) are the same as the traditional HT if an infinitely long box function is taken as win($\tau$). For a finite length of win($\tau$), equations (7)–(9) become equivalent to the traditional HT with a truncated operator. It is well known that truncating the HT to a finite length (for example 65 samples) is often necessary in practice. In other words, equations (3)–(5) are more practical than equation (1) because the traditional HT with a truncated operator can be precisely expressed using equations (3)–(5), but not equation (1).

In accordance with the present invention, equations (3)–(5) can be extended to a Generalized Hilbert Transform (GHT) with the following definition:

$$hr(t)=\{2*\Sigma\omega(\text{Real }\{X(t,\omega)\})^n+\text{Real}(\{X(t,0)\})^n\}^{1/n} \quad (10)$$

$$hi(t)=\{2*\Sigma\omega(\text{Imag}\{X(t,\omega)\})^n\}^{1/n} \quad (11)$$

$$h(t)=hr(t)+i\cdot hi(t) \quad (12)$$

with n=1, 2, 3 . . . .

In equations (10)–(12), hr and hi are the real and imaginary parts of the complex trace produced by the GHT. Equations (10)–(12) are therefore the definition of the $L^n$-order GHT.

When n=1, ($L^1$), equations (3)–(5) may be used, which can be equivalent to the traditional HT with, a truncated operator. Thus, the GHT has been defined in $L^n$-order (n=1, 2 . . . ), and the traditional HT is the special case (n=1) of the GHT.

Comparing the formula of the traditional Hilbert Transform with the definition of the Generalized Hilbert Transform, fundamental differences may be observed. For any given input signals (traces), the output of the traditional Hilbert Transform is unique. However, the output of the Generalized Hilbert transform will depend on the order n and the window shape and length. It is the flexibility of the Generalized Hilbert Transform that enables the creation of new applications and the improvement of existing application derived from the traditional Hilbert Transform.

The above-defined GHT has some direct benefits and applications. It is straightforward to define the instantaneous phase and envelope (amplitude) as follows:

$$\phi(t)=\tang^{-1}\{\text{Imag}[h(t)]/\text{real}[h(t)]\} \quad (13)$$

$$a(t)=\sqrt{hr*hr+hi*hi} \quad (14)$$

In complex trace analysis, the complex trace is formed by using the input trace (input data) as the real part and the HT of the input trance as the imaginary part. It is then possible to compute useful results from the constructed complex trance. As an example, the envelope of the L2 norm GHT will be equal to the well known RMS amplitude. The RMS instantanewous phase can be generated using equation 13. Thus, in the GHT framework, the RMS amplitude can additionally be associated with the corresponding real part, the corresponding imaginary part and the corresponding instantaneous phase.

FIGS. 1A–1C and 2A–2C illustrate the application of both the traditional Hilbert transform and the L2 norm GHT to known data to demonstrate the results achieved by the two methods. In particular, FIG. 1A represents a simple form of input data without noise. FIG. 1B represents the instantaneous phase generated by the traditional Hilbert transform, and FIG. 1C represents the instantaneous phase generated by the L2 norm GHT. It will be seen that in the noise-free case, both methods produce the same result.

However, in the real world, data is never noise-free, and the problem with the traditional HT is its sensitivity to noise. In theory, the operator length is infinitely long and the transform is not local. Each sample of the input signal, even an anomalous spike, will affect the entire output trace after the traditional HT. In practice, one usually has to truncate the operator to reduce the global effects, typically to around 61 samples. However, even with truncation, the traditional HT is not as good as the GHT for noisy data.

Figures 2A, 2B, 2C:
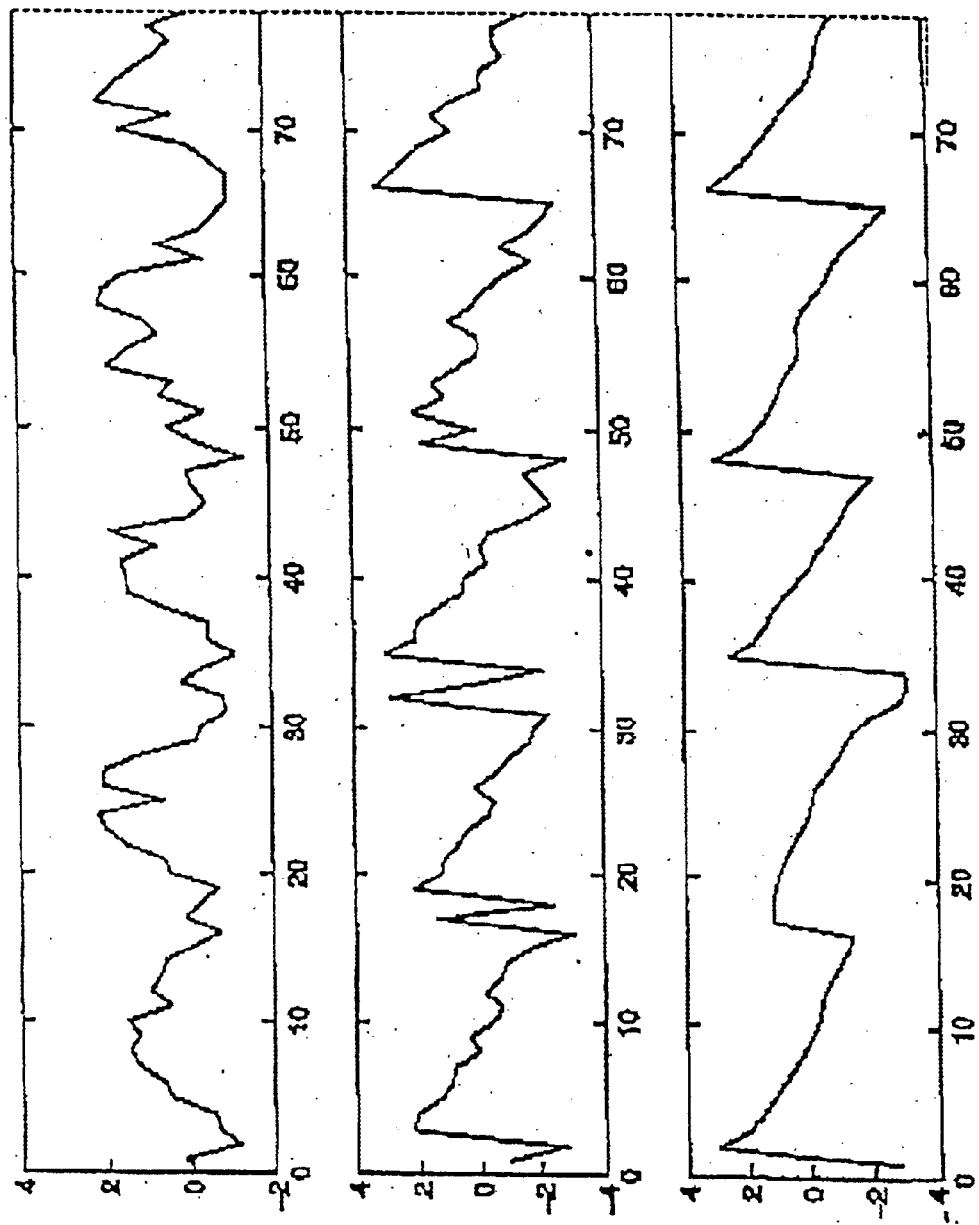
FIG. 2A is a graph of illustrative input data to represent seismic data with noise for processing.
FIG. 2B is a graph of a conventional Hilbert transform of the data of FIG. 2A.
FIG. 2C is a graph of a Generalized Hilbert Transform in accordance with the first embodiment of the present invention of the data of FIG. 2A.

This is shown in the figures. FIG. 2A represents the same input data as FIG. 1A except that the input data has noise added. FIG. 2B represents the instantaneous phase generated by the traditional Hilbert transform, and FIG. 2C represents the instantaneous phase generated by the L2 norm GHT. Knowing from FIGS. 1B and 1C what the correct result should be, it is clear that the L2 norm GHT according to an embodiment of the present invention produces a result that is much closer to the correct result than the result produced by the traditional Hilbert transform.

An interesting feature of the GHT is that the RMS amplitude is the same as the envelope of the $L^2$-order GHT. Under the GHT framework, the HT of a trace is the $L^1$-order GHT, and an RMS phase can be generated with the GHT that does not exist in the traditional HT.

This demonstrates that the GHT according to the present invention may be used advantageously for general complex seismic trace analysis. In accordance with a further aspect of the present invention, the GHT may be advantageously applied specifically to seismic data for detecting faults and channels.

Like edge detection for two-dimensional imaging processing in the electrical engineering field, both the conventional derivative and coherence methods in the seismic field are sensitive to rapid or abrupt changes in the seismic wavefield. However, these methods encounter major limitations when the seismic wavefield changes gradually rather than abruptly.

Figure 3A:
FIG. 3A illustrates the amplitude plot of an ideal fault.
Figure 3B:
FIG. 3B illustrates the amplitude plot of an ideal channel.

The differences between an ideal, abrupt fault or channel, which the conventional methods can detect accurately, and a gradual fault or channel are illustrated in FIGS. 3A–3D. FIG. 3A illustrates the amplitude plot of an ideal fault and FIG. 3B illustrates the amplitude plot of an ideal channel. The ideal fault or channel may be seen to be characterized by sharp and abrupt changes in amplitude. For further understanding, FIGS. 4A and 4B illustrate an ideal fault, namely a sharp or abrupt fault, as presented by data. In particular, FIG. 4B shows the synthetic seismic data of the ideal fault, while FIG. 4A illustrates the amplitude profile taken along a specific time in FIG. 4B (indicated by the dashed line).

Figure 3C:
FIG. 3C illustrates the amplitude plot of a non-ideal, i.e. gradual, fault.
Figure 3D:
FIG. 3D illustrates the amplitude plot of a non-ideal, i.e. gradual, channel.
Figures 4A, 4B:
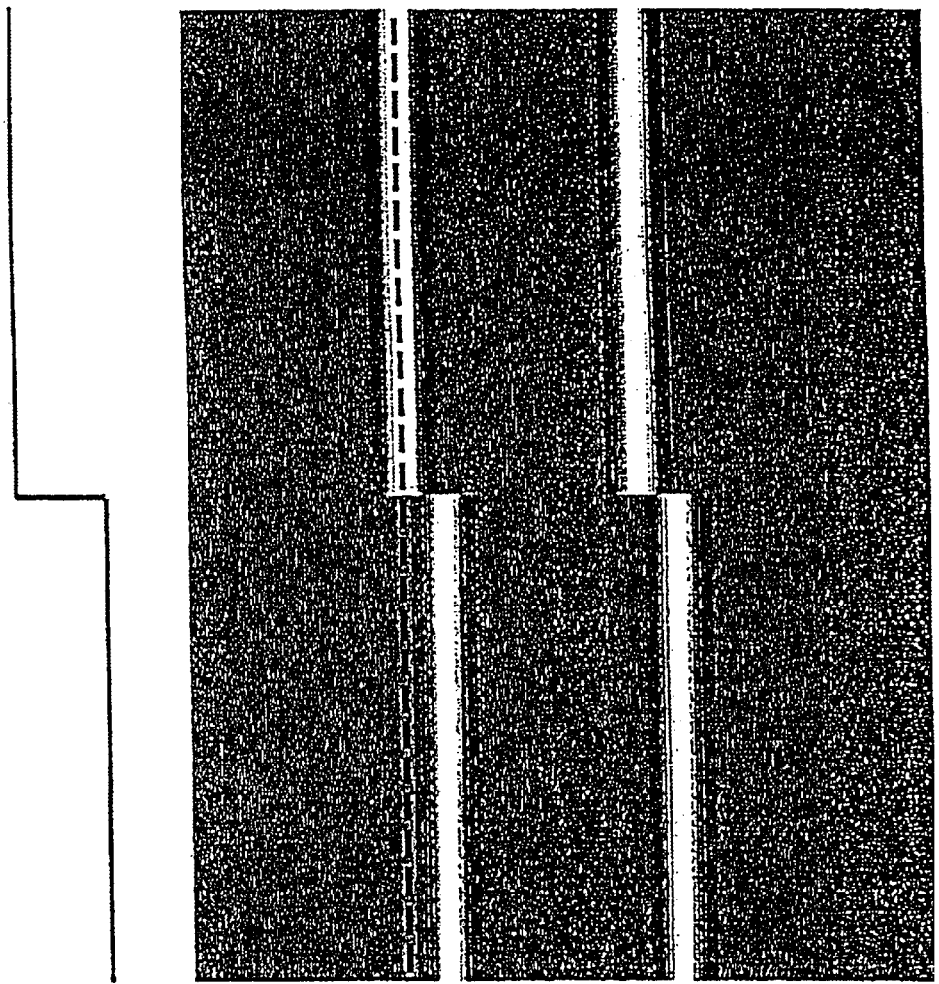
FIG. 4A illustrates synthetic seismic data of an ideal fault.
FIG. 4B is an amplitude profile of the synthetic seismic data of FIG. 3A along a specific time indicated by the dashed line FIG. 3A.

In contrast, FIG. 3C illustrates the amplitude plot of a non-ideal, gradual fault, and FIG. 3D illustrates the amplitude plot of a gradual channel. It has been found that conventional methods, designed to look for local abrupt change, have suffered limitations in detecting and capturing transitional faults and channels such as the gradual changes represented by the amplitude plots of FIGS. 3C and 3D.

For example, suppose that the seismic data is represented as one or more sine curves. Taking the derivative of sin($\omega t$) results in $\omega$*cos($\omega t$). The factor $\omega$ indicates that the high frequency portion will be emphasized.

On the other hand, when applying the GHT to sin($\omega t$), the result will be cos($\omega t$), i.e without the additional factor $\omega$. Without this factor, the higher frequencies are not emphasized, and therefore both rapid and slow changes may be captured. Using the GHT is more effective than the traditional Hilbert transform method in other ways as well, since the windowed Fourier transform can use the window width to avoid unwanted global effects. Moreover, as demonstrated in connection with FIGS. 2A–2C, the windowed GHT is less sensitive to noise.

Figure 5:
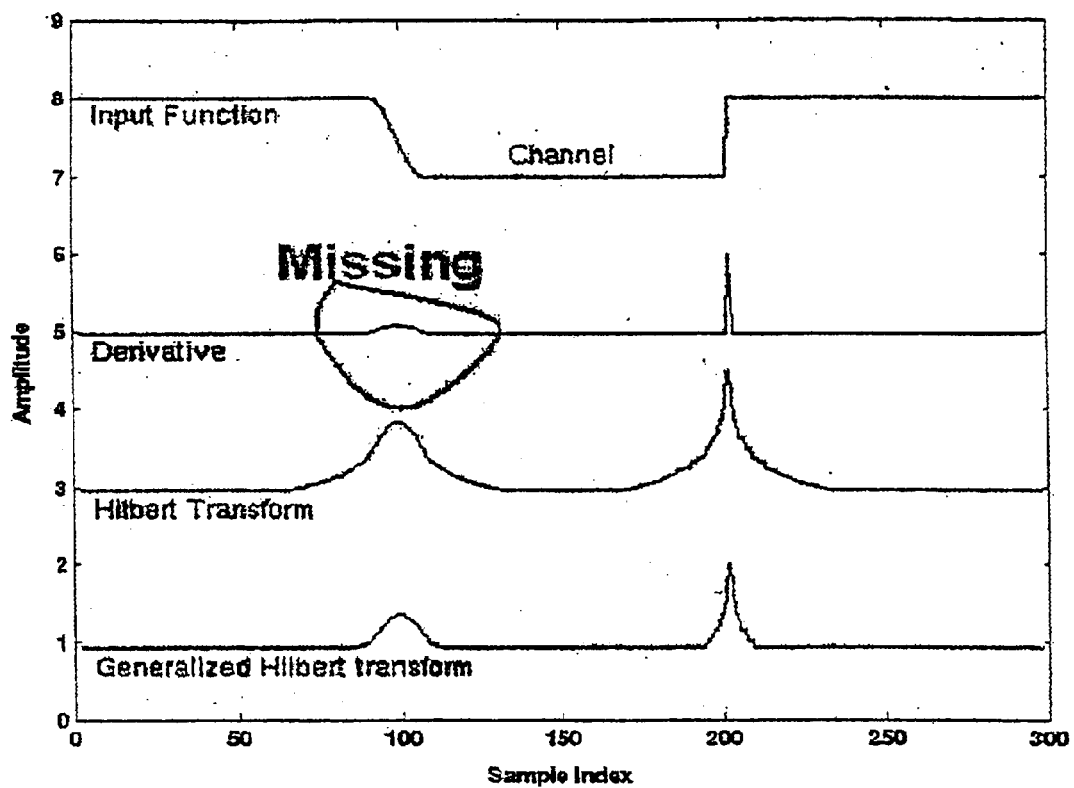
FIG. 5 illustrates the result of using a method incorporating the GHT in accordance with the present invention for a detection cube on first seismic data.

FIG. 5 illustrates the improved edge detection results for the GHT as compared with conventional seismic edge-detection methods. The top curve in FIG. 5 represents a hypothetical channel in seismic data, a time slice extracted from the synthetic seismic section. The left bank of the channel is made to change gradually, while the right bank is a sharp step function.

As shown in FIG. 5, all three methods, i.e. derivative, HT and GHT do detect the sharp changes of the right bank. However, the derivative method almost misses the left bank of the channel. In contrast, both the HT and GHT method can detect the gradual change of the left bank, but the GHT is clearly superior in yielding higher resolution.

Advantageously, using the GHT transforms a three-dimensional seismic cube into three imaginary cubes and combines the outputs to produce a detection cube. This new volume can then be viewed by itself or together with any number of attributes derived from the seismic data on a high end graphics workstation. Such attributes include the above-discussed RMS amplitude and instantaneous phase.

FIGS. 6–9 illustrate the results of employing such a detection cube on real 3D data. Here the GHT was applied in three steps. First, the L-1 norm GHT was applied on the input cube in the sub-line and cross-line directions respectively. Secondly, the L-2 norm was applied on the two results produced at the first step. Thirdly, the envelopes of the two results produced at the second step were summed. As usual, the envelope is defined as the square root of the sum of the real-part and imaginary-part squares.

Figure 6:
FIG. 6 illustrates the result of using a conventional eigenvalue method for a coherence cube on the first seismic data.
Figure 7:
FIG. 7 illustrates the result of using a method incorporating the GHT in accordance with the present invention for a detection cube on second seismic data.

FIG. 6 shows an amplitude time slice of the input 3D seismic cube. FIG. 7 is the same time slice after the application of GHT, wherein the channel system is focused and illuminated very clearly.

Figure 8:
FIG. 8 illustrates the result of using a conventional eigenvalue method for a coherence cube on the second seismic data.
Figure 9:
FIG. 9 illustrates the result of using a method incorporating the GHT in accordance with the present invention for a detection cube on the second seismic data.

FIG. 8 shows the results of using the conventional eigen-value coherence cube, while FIG. 9 is a copy of FIG. 7, placed next to FIG. 8 to demonstrate the superior results of the GHT method.

It is apparent from these figures that both the GHT and eigen-value coherence cube methods can highlight the channel system better that the original amplitude data, but the results generated by the GHT method show the channels more sharply and distinctly.

It is further believed that this improvement is due to the GHT's ability to capture not only sharp, abrupt changes, but also gradual changes in the seismic wavefields. As a result, structural features such as faults and stratigraphic features such as facies changes from reservoir quality rock to non-reservoir quality rock become clearer. The end result is a better understanding of the complexity of the subsurface reservoir through the visualization of attributes derived from the three-dimensional seismic volume.

Thus, methods incorporating the GHT in accordance with the present invention are more flexible and powerful that the traditional Hilbert transform methods for seismic data processing. These GHT methods can detect both rapid and gradual changes of the seismic wavefield with higher resolution and signal-to-noise ratio. In addition more seismic attributes, such as the RMS instantaneous phase and amplitude, can be derived based on the GHT.

In particular, the GHT can be implemented using different orders and variable window shapes and lengths, whereas the traditional HT is just one of many implementations (n=1) for a box window with infinite length. The flexibility of GHT opens the door for introducing more applications and improving existing applications in geophysics.

The GHT has also been shown to be successful in illuminating faults and channels embedded in 3D seismic data. Based on the above results, it can detect subtle features better than existing conventional methods.

While the present invention has been described with reference to the foregoing embodiments, changes and variations may be made therein which fall within the scope of the appended claims. Further changes and variations may be made thereto which are within the scope of the appended claims. All such modifications and/or changes are intended to be within the scope of the claims.

I claim:

1. A method of processing data value of seismic measurement for geophysical interpretation of the earth's subsurface, comprising the steps of:
   using a generalized Hilbert transform of an input trace of the data values to detect abrupt and gradual changes in the input trace with reduced sensitivity to noise; and
   providing results of the generalized Hilbert transform to enable identification of any detected abrupt or gradual changes.

2. A method of processing data values of seismic measurements for geophysical interpretation of the earth's subsurface, comprising the steps of:
   using a generalized Hilbert transform of an input trace of the data values to detect abrupt and gradual changes in the input trace with reduced sensitivity to noise; and
   providing the results of the generalized Hilbert transform to enable identification of any detected abrupt or gradual changes;
   wherein the generalized Hilbert transform is formulated using a windowed Fourier transform.

3. The method of claim 2, wherein the data values are seismic data values.

4. The method of claim 2, wherein the Fourier transform is windowed using a window function comprising a box function centered at $\tau=0$.

5. The method of claim 2, wherein the Fourier transform is windowed using a window function comprising a Gaussian function.

6. The method of claim 2, wherein the Fourier transform is windowed using a window function that limits the extent of computation of the Fourier transform.

7. The method of claim 6, wherein
   (a) the input trace is represented as $x(t)$, where t indicates time,
   (b) the window function is represented by $win(\tau)$,
   (c) a first function is defined as $g(\tau)=x(t-\tau)\cdot win(\tau)$,
   (d) $X(t,\omega)$ is the Fourier transform of $g(\tau)$,
   (e) $hi(t)$ represents a sum over imaginary portions of $X(t,\omega)$,
   (f) $hr(t)$ represents a sum over real portions of $X(t,\omega)$, and
   (g) the modified Hilbert transform is $h(t)=hr(t)+i\cdot hi(t)$.

8. The method of claim 7, wherein the function $win(\tau)$ limits the extent of computation of the Fourier transform.

9. The method of claim 7, wherein the function $win(\tau)$ is a box function centered at $\tau=t$.

10. The method of claim 7, wherein the function $win(\tau)$ is a Gaussian function centered at $\tau=t$.

11. The method of claim 7, wherein $hr(t)=\Sigma\omega Real\{X(t,\omega)\}$ and $hi(t)=\Sigma\omega Imag\{X(t,\omega)\}$.

12. The method of claim 7, wherein for any integer n greater than 1, $hr(t)=\Sigma\omega Real\{X(t,\omega)\}^n$ and $hi(t)=\Sigma\omega Imag\{X(t,\omega)\}^n$.

13. The method of claim 7, wherein the instantaneous phase of the input trace $x(t)$ is $\phi(t)=tang^{-1}\{Imag[h(t)]/Real[h(t)]\}$.

14. The method of claim 7, wherein the envelope of the input trace $x(t)$ is $a(t)=sqrt\{hr*hr+hi*hi\}$.

15. The method of claim 2, wherein the results are provided by display upon a graphics workstation.

16. The method of claim 15, wherein the results are displayed as a three-dimensional display.

17. A method of processing data value of seismic measurements for geophysical interpretation of the earth's subsurface, comprising the steps of:

using a modified Hilbert transform, constituted of a windowed Fourier transform, of an input trace of the data values to detect abrupt and gradual changes in the input trace with reduced sensitivity to noise; and providing a three-dimensional display of the results of the modified Hilbert transform to enable visual identification of any detected abrupt or gradual changes.

18. The method of claim 17, wherein the data values are seismic data values.

19. The method of claim 17, wherein the Fourier transform is windowed using a window function comprising a box function centered at $\tau=t$.

20. The method of claim 17, wherein the Fourier transform is windowed using a window function comprising a Gaussian function centered $\tau=t$.

21. The method of claim 17, wherein the Fourier transform is windowed using a window function that limits the extent of computation of the Fourier transform.

22. The method of claim 21, wherein
(a) the input trace is represented as $x(t)$, where t indicates time,
(b) the window function is represented by $win(\tau)$,
(c) a first function is defined as $g(\tau)=x(t-\tau) \cdot win(\tau)$,
(d) $X(t,\omega)$ is the Fourier transform of $g(\tau)$,
(e) $hi(t)$ represents a sum over imaginary portions of $X(t,\omega)$,
(f) $hr(t)$ represents a sum over real portions of $X(t,\omega)$, and
(g) the modified Hilbert transform is $h(t)=hr(t)+i \cdot hi(t)$.

23. The method of claim 22, wherein $hr(t)=\Sigma\omega Real \{X(t,\omega)\}$ and $hi(t)=\Sigma\omega Imag \{X(t,\omega)\}$.

24. The method of claim 22, wherein for any integer n greater than 1, $hr(t)=\Sigma\omega Real \{X(t,\omega)\}^n$ and $hi(t)=\Sigma\omega Imag \{X(t,\omega)\}^n$.

25. The method of claim 22, wherein the instantaneous phase of the input trace $x(t)$ is $\phi(t)=tang^{-1} \{Imag[h(t)]/Real[h(t)]\}$.

26. The method of claim 22, wherein the envelope of the input trace $x(t)$ is $a(t)=sqrt\{hr*hr+hi*hi\}$.

* * * * *